Oct. 24, 1967  C. J. AHERN  3,348,773
FLUIDIC FLIP FLOP DEVICES
Filed Feb. 10, 1966

INVENTOR.
CHARLES J. AHERN
BY
Richard J. Seeger
ATTORNEY

United States Patent Office 3,348,773
Patented Oct. 24, 1967

3,348,773
FLUIDIC FLIP FLOP DEVICES
Charles J. Ahern, Detroit, Mich., assignor to The Bendix Corporation, a corporation of Delaware
Filed Feb. 10, 1966, Ser. No. 526,498
7 Claims. (Cl. 235—201)

This invention pertains to fluid devices of the kind having non-moving parts wherein one fluid flow is controlled by additional fluid flows. More particularly, this invention pertains to fluid devices which may have a splitter stage for receiving and directing fluid control pulses to the control area of a second or output stage which controls the direction of fluid flow in the output stage. The two stage device can provide one output pulse for every two input pulses and hence can be used as a counter.

It is an object of this invention to provide in a fluid device two control input legs in addition to an input pulse passage, with the control legs being connected to the input passage in such a manner that a pulse in a control leg will result in a flow in a desired output leg regardless of the presence of a pulse in the input passage. In previous systems, a pulse to a control leg was effective only if there was a coexisting pulse in the input passage. In the preferred embodiment, this object is accomplished by forming the control legs at an acute angle to the input passage of the first stage of the conventional right angle connection.

It is an object of this invention to combine the device of the previous object with a second stage to form a counter where two input pulses result in one output pulse.

Figure 1:
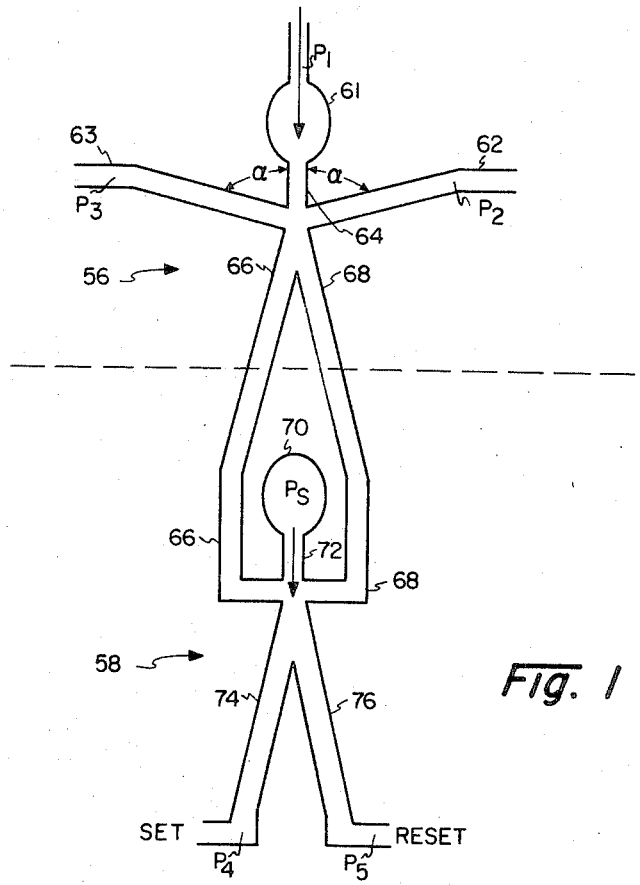
Figure 2:
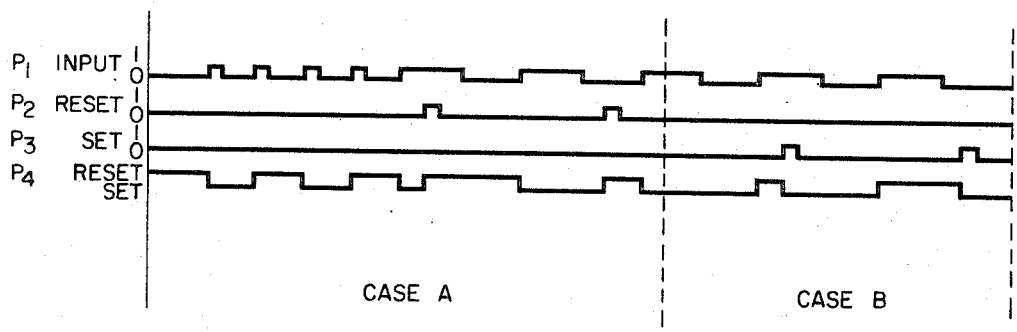

These and other objects and advantages will become more apparent when preferred embodiments of this invention are described in connection with the drawings in which:

FIGURE 1 is a schematic showing of the embodiment having two control inputs which can cause appropriate selection of output flow direction with or without the presence of an input pulse; and FIGURE 2 is a graph showing the operation of the device of FIGURE 1.

The embodiment of FIGURE 1 shows a fluid device having a splitter stage 56 and an output stage 58. The splitter stage 56 has passage 61 with pressure $P_1$ passage 62 with pressure $P_2$ and passage 63 with pressure $P_3$. Passages 62 and 63 are connected to common passage 64 which connects passage 61 with left control leg 66 and right control leg 68. Passages 62 and 63 form an angle alpha with common passage 64 which is an acute angle and which is in a range so that the flow from passage 63 will be directed at least partially at the outer wall of leg 68, whereby the flow from passage 63 will result in flow down leg 68, and the flow from passage 62 will be directed at least partially toward the outer wall of passage 66 resulting in flow down leg 66.

The output stage 58 of the embodiment of FIGURE 1 has pressure supply port 70 from which a constant supply pressure $P_S$ is provided and common passage 72 which connects port 70 with left output leg 74 and right output leg 76. When flow is in leg 74, the device is in a "set" position and when flow is in leg 76, the device is in a "reset" position. Control legs 66 and 68 are connected to common passage 72.

OPERATION OF THE EMBODIMENT OF FIGURE 1

In defining the operation of the embodiment of FIGURE 1, the graph of FIGURE 2 will be used.

Case A

Assume that the flow from port 70 is flowing in leg 74 of the output device. This will cause a flow up leg 68 and down leg 66 due to the aspiration of leg 66 by the flow from common passage 72 which is attached to leg 74. The flow can be switched from leg 74 to 76 with an input pulse to port 61 and/or leg 62. In previous devices, a pulse only in passage 62 would not result in a change in flow from output leg 74 to output leg 76 and hence this device of this invention adds an additional control function. A pulse from leg 62 will cause a change in flow from output leg 74 to 76. Since the angle alpha is acute, the very flow coming down leg 62 will be deflected into leg 66 resulting in sufficient pressure to change $P_S$ flow from leg 74 to leg 76. This operation can be seen in the "Case A" portion of the graph of FIGURE 2. A $P_2$ pulse will reset the output stage 58 whether or not there is a $P_1$ pulse.

Case B

Assume that the supply pressure flow from port 70 is through leg 76 in the output stage of the device of FIGURE 1. A flow down leg 68 and up leg 66 will be established by the aspiration of fluid from leg 68 by the $P_S$ flow from passage 72 which is attached to the wall of leg 76. If leg 61 and/or leg 63 receives an input pulse, the flow will be changed from leg 76 to 74 due to the increased pressure in leg 68. Again, the reason that a pulse from only leg 63 will effect a change of state is the acute nature of angle alpha which causes a pulse to flow from leg 63 to leg 68. In previous devices, this was not possible to accomplish. This operation can be seen in FIGURE 2, "Case B," where a $P_3$ pulse will set the output of stage 58 whether or not there is a $P_1$ pulse.

Although this invention has been disclosed and illustrated with reference to particular applications, the principles involved are susceptible of numerous other applications which will be apparent to persons skilled in the art. The invention is, therefore, to be limited only as indicated by the socpe of the appended claims.

Having thus described my invention, I claim:
1. Fluid device comprising
    means for receiving a fluid signal,
    first means having a common passage with a bifurcation forming two channels in which the fluid signal may flow,
    means for receiving a fluid supply,
    second means for providing two channels in which the fluid supply may flow,
    the channels of the first means being connected to said second means to change the flow path of the fluid supply from one of the channels of said second means to the other of the channels of said second means,
    first control means connected to said common passage and before said bifurcation for causing a control fluid flow across said common passage and into one channel of said first means to direct the path of the fluid flow supply to one of the channels in said second means regardless whether the fluid signal to the first means is present,
    second control means connected to said common passage and before said bifurcation for causing a control fluid flow in another of said first means to direct the path of the fluid flow supply into the other of the channels of said second means regardless of the presence of the fluid flow signal to the first means.
2. A fluid device of the kind having a signal leg bifurcated into two signal passages so that a fluid stream flowing from said signal leg will flow into one or the other of the signal passages, a supply leg which is bifurcated into two output legs so that a fluid stream flowing in said supply leg will flow into one or the other of said output legs, the signal passages of said signal leg being connected to said supply leg so that each fluid signal applied to the signal leg can change the flow of the supply leg from one output leg to the other, that improvement comprising
- at least one control leg in the plane of the bifurcation of said signal leg,
- said control leg being connected to the signal leg and before the bifurcation so that the fluid stream of the control leg is directed across the signal leg and into one of the signal passages,
- whereby the fluid stream from the control leg will direct flow into said one signal passage regardless whether a fluid signal is received by the signal leg.

3. The device of claim 2 with
- a second control leg being in the plane of the bifurcation of the signal leg and connected to the signal leg and before the bifurcation to direct the fluid stream from the second control leg across the signal leg and into the other signal passage so that the stream from the second control leg will direct a fluid flow into the other of the signal passages whether or not fluid signal is present in the signal leg.

4. The device of claim 3 with
- said control leg forming an angle with said signal leg which will direct at least a portion of the fluid flow of the control leg between the second control leg opening and said other signal passage,
- said second control leg forming an angle with said signal leg which will direct at least a portion of the fluid flow from the control leg between the opening of said control leg and said one signal passage.

5. The device of claim 2 with
- said control leg forming an acute angle with the signal leg so that the fluid stream of the control leg will be caused to flow into said one of the signal passages.

6. A fluid device comprising
- first means having a common passage means to receive a fluid flow with said fluid flow passing through said common passage means,
- a pair of output channels connected to said common passage means to receive the flow from said common passage means,
- first control means connected to said common passage means to cause a first control flow across said common passage means to direct the flow from said first means to a first output channel which is on the opposite side of said common passage means from said first control means,
- said first control means to cause a flow to enter said first input channel regardless of the presence of a flow in said first means,
- second control means to cause a second control flow to direct the flow from said first means to the other output channel.

7. The device of claim 6 with
- said second control means to cause a flow to enter said other output channel regardless of the presence of a flow in said first means.

References Cited
UNITED STATES PATENTS

| | | | |
|---|---|---|---|
| 3,001,698 | 9/1961 | Warren | 235—201 |
| 3,030,979 | 4/1962 | Reilly | 137—81.5 |
| 3,155,825 | 11/1964 | Boothe | 235—201 |
| 3,228,602 | 1/1966 | Boothe | 235—201 |
| 3,244,370 | 4/1966 | Colston | 235—201 |
| 3,285,264 | 11/1966 | Boothe | 235—201 |

RICHARD B. WILKINSON, *Primary Examiner.*

L. R. FRANKLIN, *Assistant Examiner.*